April 25, 1939.  F. M. HUDSON  2,155,550

VALVE CONSTRUCTION

Filed July 12, 1937

INVENTOR
FRANK M. HUDSON
BY HARRIS, KIECH, FOSTER & HARRIS

ATTORNEYS.

Patented Apr. 25, 1939

2,155,550

UNITED STATES PATENT OFFICE 2,155,550

VALVE CONSTRUCTION

Frank M. Hudson, Walnut Park, Calif., assignor to Pacific Pump Works, Huntington Park, Calif., a corporation of California Application July 12, 1937, Serial No. 153,208

1 Claim. (Cl. 251—121)

My invention relates to valves, and particularly to a ball cage valve construction adapted for fluid pumps and the like as either a standing valve or a traveling valve therefor.

It is a common characteristic of ordinary ball valves that when the ball is unseated and fluid is flowing through the valve seat, the ball is caused to spin or chatter by the force of the fluid. This spinning or chattering of the ball is caused by fluid surging or eddying around the upper surface of the ball within the ball chamber.

This eddying of fluid around the ball is particularly disadvantageous in pumping oil as in some instances where there is water present in the oil, the eddying or surging of the fluid around the ball within the valve cage results in considerable "cutting" or emulsifying of the oil and water.

It is therefore an object of the invention to provide in a ball valve construction a recess in the ball chamber or cage into which the ball moves when it is unseated from the valve seat to prevent eddying of the fluid around the top of the ball within the cage.

It is another object of my invention to provide in a valve construction including a valve seat, a ball seat disposed to be engaged by the ball when it is unseated from the valve seat, the ball seat conforming to substantially half the spherical surface of the ball, whereby eddying of the fluid around the upper surface of the ball within the valve chamber or cage is prevented.

It is another object of my invention to provide in a valve construction including a valve seat, a ball seat disposed to be engaged by the valve ball when it is unseated from the valve seat so that the ball is held by the ball seat in a centralized position with respect to the valve seat so that the ball will drop more directly into the valve seat and the ball is prevented from chattering when it is unseated from the valve seat.

These and other objects will be apparent from the following part of the specification in conjunction with the accompanying drawing.

Figure 1:
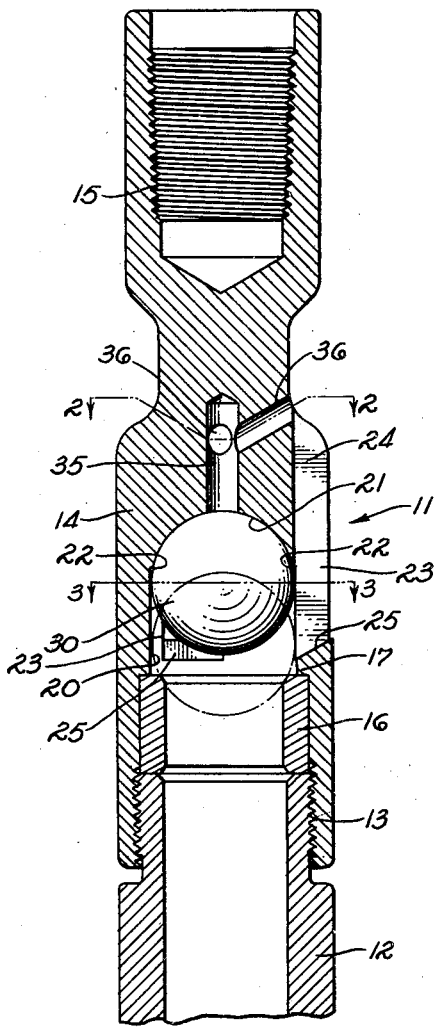
Fig. 1 is a longitudinal section through a portion of a pump barrel, showing the novel features of my valve structure.
Figure 2:
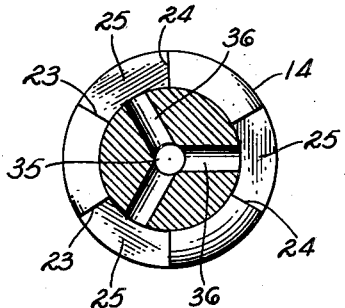
Fig. 2 is a cross-section taken as indicated by the line 2—2 of Fig. 1.
Figure 3:
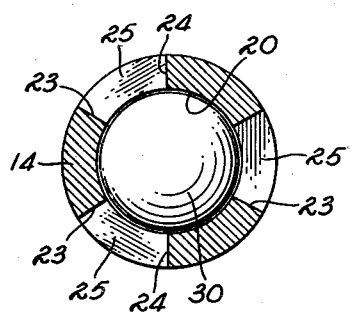
Fig. 3 is a horizontal cross-section taken as indicated by the line 3—3 of Fig. 1.

In Fig. 1, I show my valve structure as being included in a fluid pump structure 11 comprising a barrel 12, to the upper threaded end 13 of which is secured a valve cage 14 which in this instance is illustrated as being a so-called box-top cage, having a threaded box or recess 15 at the top thereof for connection to a string of sucker rods.

An annular insert valve seat 16 is confined between a shoulder 17 formed in the cage 14 and the upper end of the barrel 12.

Formed in the body of the cage above the valve seat 16 is a cylindrical ball chamber 20 terminating at the upper end in a substantially semi-spherical surface 21, which I shall hereinafter refer to as the "ball seat" to distinguish this seat from the valve seat 16. The largest diameter of the semi-spherical surface 21 defined by the peripheral edge 22 indicated in Fig. 1, is only slightly smaller than the diameter of the cylindrical ball chamber 20, as shown. Formed in the side wall of the cage 14 are a plurality of outwardly flaring openings 23, preferably formed by providing grooves 24 in the outer surface of the cage of such depth that the lower ends of the grooves communicate with the valve chamber 20 as shown. The lower walls 25 of the grooves 24 forming the openings 23 preferably are formed to slope downwardly from the outer surface of the cage to the point of communication with the ball chamber 20 substantially as shown. A valve ball 30 is confined within the ball chamber and preferably is of such a diameter as to substantially completely fill the cross-sectional diameter of the chamber 20, while being freely movable therein from its seated position on the valve seat 16, as indicated by dotted lines, into its seated position in the ball seat 21, as indicated in solid lines.

It will be noted that with the ball 30 seated in the ball seat 21 substantially the entire upper half of the spherical surface of the ball is covered, which effectively prevents surging or eddying of fluid around the upper surface of the ball, as in the ordinary type of ball valve having a flat surface against which the ball bumps when it is unseated. Likewise, with the ball 30 in the raised position and substantially completely filling the cross-sectional area of the ball chamber, the smooth under-surface of the ball cooperates with the walls forming the openings 23 to cause a smooth flow of liquid outwardly and upwardly to the exterior of the pump without undue agitation of the liquid which in the case of oil and water mixture tends to cause cutting of the oil.

My invention has a special utility since it can be applied to existing pumps. When so applied, the oil is delivered through the openings 24 to the groove outside the center of the cage and flows freely upward around the head thereof. The valve therefore takes up no more room than the standard valve and requires no change in the pump.

In order to prevent possible sticking of the ball 30 to the spherical ball seat when the pump is raised, I prefer to provide port means communicating between the recess formed by the semi-spherical wall 21 and the exterior of the pump. In the form shown I provide a vertical bore 35 extending upwardly from the recess 21 which communicates with a plurality of divergent ports 36 extending to the exterior of the cage, as shown.

Although I have shown my invention in simple form, it should be understood that I do not intend the invention to be limited to cage valves of the type shown, since it is apparent that the ball seat of my invention could be adapted to numerous types of ball valves for the purposes above disclosed; namely, the prevention of eddying of fluid around the upper surface of the ball when the ball is unseated, the prevention of spinning or chattering of the ball, and for the purpose of holding the ball centralized with respect to the valve seat so that it will drop more squarely into the valve seat. Therefore, the scope of my invention should be limited only by the appended claim and not by the details of the description of the illustrative drawing.

I claim as my invention:

In a pump, a valve structure comprising: a cage having a groove formed in the exterior thereof intermediate of its ends, said cage being provided with a central cylindrical cavity connected to said groove through slots cut in the periphery of the lower portion of said cage; a ball slightly smaller in diameter than said cavity; and a ball seat upon which said ball may rest when said valve is closed, said cavity being sufficiently long to allow said ball to rise from said seat and allow a free flow of liquid through said seat when said valve is open, the upper end of said cavity having a concave ball seat conforming to the curvature of said ball, an opening being provided through said concave ball seat connecting said cavity to said groove.

FRANK M. HUDSON.